July 10, 1923.

H. V. MULFORD ET AL

COOKING UTENSIL

Filed April 7, 1922

1,461,366

Harold V. Mulford
& Walter D. Felty.
INVENTORS

BY Victor J. Evans
ATTORNEY

WITNESS:

Patented July 10, 1923.

1,461,366

UNITED STATES PATENT OFFICE.

HAROLD V. MULFORD AND WALTER D. FELTY, OF PAULSBORO, NEW JERSEY.

COOKING UTENSIL.

Application filed April 7, 1922. Serial No. 550,348.

*To all whom it may concern:*

Be it known that we, HAROLD V. MULFORD and WALTER D. FELTY, citizens of the United States, residing at Paulsboro, in the county of Gloucester and State of New Jersey, have invented new and useful Improvements in Cooking Utensils, of which the following is a specification.

This invention relates to cooking utensils and it has more particular reference to that type or form of utensil which is provided with means for preventing the boiling over of liquid therefrom, the primary object of our invention being to provide a novel form of cooking utensil which when in use prevents scorching, burning, or over-boiling of its contents.

Another object of our invention is the provision of a cooking utensil of the foregoing referred to character which greatly facilitates the cooking of comestibles and the like without appreciable loss of any of their nutritive qualities.

Further objects attained by this invention are the provision of a cooking utensil which is simple in construction, cheap to manufacture, efficient in use, and free from the disadvantages inhering to general constructions at present in vogue, the same being adversely affected by expansion and contraction which frequently results in the separation of the co-related parts.

With these and other objects in view our invention essentially consists in certain novel features of construction, combinations and arrangements of parts hereinafter fully described and more particularly defined by the appended claims.

In the further disclosure of the invention reference is to be had to the accompanying sheet of explanatory drawings constituting a part of this specification and in which like characters of reference designate the same or corresponding parts in all the views.

Figure 1:
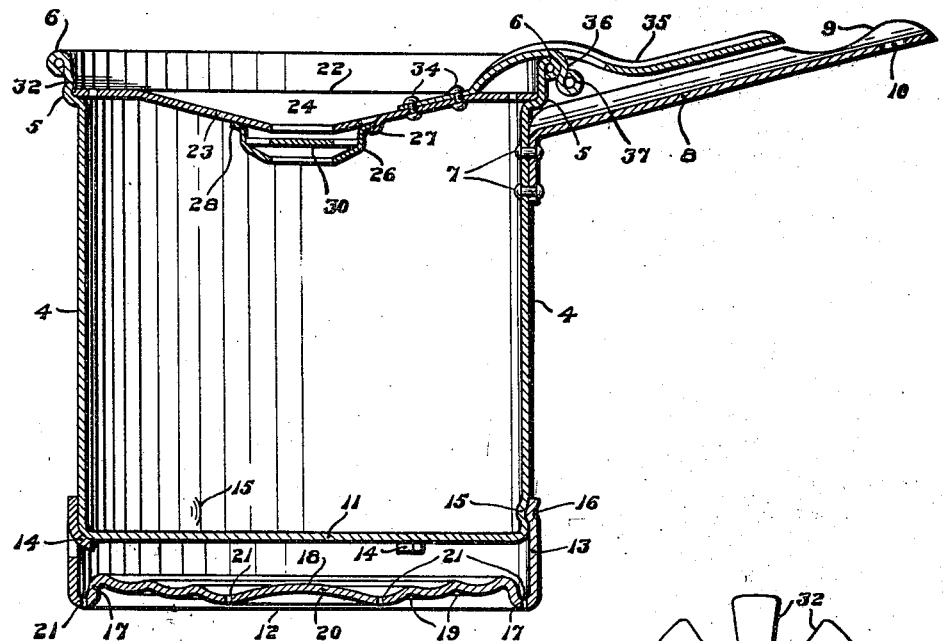
Figure 1 is a sectional elevation through a cooking utensil embodying our improvements.

Referring more particularly to the views the numeral 4 designates a pan or vessel of appropriate material—preferably aluminum— which is moulded or fashioned about its upper part with an outwardly expanded portion or shoulder 5 finished off at its extreme upper edge with a spun bead 6. Attached to the aforesaid pan or vessel 4 as by rivets 7 is a handle 8 of concavo-convex cross section, the outer end whereof is shaped as shown at 9 to constitute a comfortable hand-hold, while a hole or slot 10 is punched therethrough to provide a means whereby the utensil may be hung up when not in use.

Adapted for snug fitment to the bottom 11 of the aforesaid pan or vessel 4 is an extension or false bottom 12, the same being provided about its vertical wall 13 with a series of inwardly directed tongues 14 appropriately stamped out therefrom, said tongues serving as a seat or support for the bottom 11 of the aforesaid pan or vessel 4. In order to immovably lock the extension or false bottom 12 to the pan or vessel 4 we provide a series of inwardly directed indents 15 about the lower portion of said pan or vessel 4 into which are forced or sprung correspondingly shaped and inwardly directed tits 16 provided about the perimeter or vertical wall 13 of the false bottom 12, and it will be readily understood by those acquainted with the sheet metal industry that by this means we have furnished an effective manner of securely supporting and connecting together in proper relation the pan or vessel 4 and the false bottom 12.

An important feature to be particularly noted at this point is that we have found by actual experiments in connection with cooking utensils of analogous or like nature to the one forming the subject matter of our present invention that where the same have been provided with a false bottom it has usually been the practice to make such false bottom of a different kind of heat resisting material to that of the pan or vessel portion. As a result of these tests we have evolved the means just described for supporting and locking the false bottom 12 to the pan or vessel 4, and furthermore we make said false bottom 12 of the same material—preferably aluminum—as the pan or vessel 4 so that the ratio of expansion and contraction is the same in both portions. In other words, cooking utensils of the nature and character hereinbefore referred to have heretofore been proven somewhat objectionable in use, due to the different character and heat resisting qualities of the false bottom relative to the pan or vessel portion it frequently obtaining that when a cooking utensil has been removed from the fire and placed on the side to cool that the pan or vessel portion has become easily detached from the false bottom portion thereby resulting in much inconvenience when using utensils of the nature set forth.

The aforesaid false bottom 12 is preferably made of the cross section shown in Figure 1, that is to say, it is curved inwardly around its basal portion 17 into somewhat U-shaped cross section, whilst the inner portion of the bottom 18 is fashioned or spun with a series of stepped corrugations 19, the central portion thereof being upwardly dished as shown at 20. In order to permit the free entry for circulation of air or liquid into the space intervening the bottom 18 and the vessel or pan bottom 11, the false bottom is provided with a series of perforations or holes 21 therethrough.

Adapted to seat in the hereinbefore referred to shoulder or expanded part 5 is a lid or cover 22, the central portion 23 whereof is somewhat funnel-shaped and provided with an axial aperture 24 therethrough. Around the flat or upper portion of the lid 22 we provide a series of perforations 25 for a purpose later on explained. Supported beneath the central part of the funnel-shaped portion 23 of said lid 22 is what may be termed a basket or carrier 26 preferably of the cross section clearly shown in Figure 1, and it is to be noted that this basket 26 is locked on the underside of the funnel-shaped portion 23 by means of depending tongues 27 stamped out therefrom engaging beneath the peripheral flange 28 of the basket 26.

Figure 2:
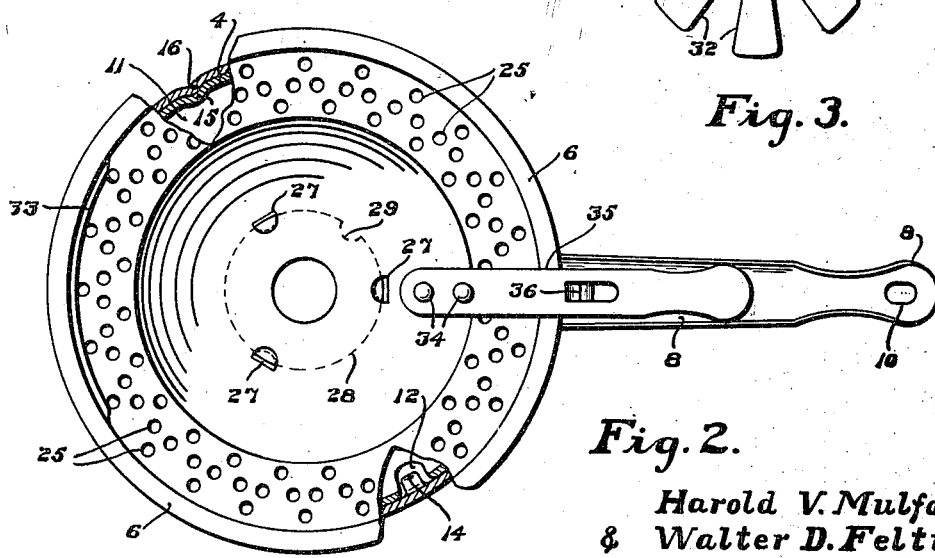
Figure 2 is a top plan view of the same with parts broken away or in section to disclose the underlying structure; and, Figure 3 is a detail plan to an enlarged scale of a float valve hereinafter more fully described.

It will be readily understood from an inspection of Figure 2 that the peripheral flange 28 of the basket 26 is provided with a notched out part 29 and those acquainted with the art will readily understand that by the provision of said notched out part 29 an easy and simple means is provided whereby the said basket can be removably engaged beneath the funnel-shaped part 23, it being obvious that when the flange part 28 is slipped beneath two of the depending tongues 27 with the notched part 29 in register with the third one by slightly turning said basket it may be removably locked beneath the lid or cover 22.

Figure 3:
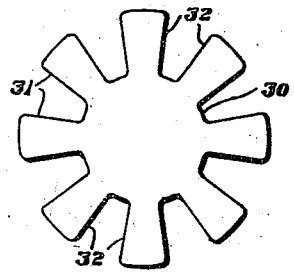

Disposed within the basket 26 is a float or valve member 30 shown to an enlarged scale in Figure 3. This float is provided with a plurality of radial arms 31 between which are intervening spaces 32 and it will be readily understood by those acquainted with the art that this float or valve 30 is adapted to rise and fall within the basket. On an examination of Figure 1 more particularly it will be seen that when the float or valve 30 rises the central portion thereof will serve to close the aperture 24 in the lid 22 and this float or valve 30 serves in use to prevent overboiling through the said central aperture 24 as later on explained. Appropriately formed at the frontal portion of the pan or vessel, and in the expanded or shouldered part 5 we form an inwardly directed arcuate rib 33 as clearly shown in Figure 2 of the drawings, and beneath this rib 33 the frontal part of the lid or cover 22 is adapted to be projected and snugly engaged. At the back portion of the lid we attach as by rivets 34 a handle 35 which is of the cross section clearly shown in Figure 1, that is to say, it is upwardly curved to pass over the spun bead 6 of the pan or vessel 4 and shaped to lie in neat spaced relation relative to the pan handle 8. In order to provide an effective means for locking the lid or cover 22 in position in the expanded or shouldered part 5, we stamp out from the handle 35 a downwardly depending tongue 36, the free end whereof is rolled or turned at 37 so as to constitute a spring gripping device for engagement over the edge and slightly under the aforesaid bead 6, and it will be readily understood that by the engagement of the lid 22 beneath the arcuate bead 33 and the locking of the spring tongue 37. In engagement on the bead 6 an effective and novel means is provided for holding the said lid or cover in place. Still further the same is of a nature and character which lends itself to ease and facility in use in that there is no necessity to swing the lid or cover about its axis to effect a locking engagement in the pan or vessel, the same being perfectly obvious to those acquainted with the art that the most inexperienced person will readily see the manner of placing the lid in the pan which will result in its prompt and easy locking.

From the foregoing description and an examination of the drawings it will be readily seen that when a pan or cooking utensil embodying our improvements is placed over a flame or fire the heat will be directed evenly over the false bottom 12 due to the peculiar undulating formation of the inner false bottom 18. This distribution of the heat results in the major portion thereof being directed against the upset part 17, that is to say, evenly around the bottom edges of the pan or vessel. A certain proportion of the heat or flame will be directed through the perforations 21 and it will be perfectly obvious that a prompt circulation of liquid will be set up in the pan or vessel 4 whereby the boiling or cooking operation is more promptly brought about and accomplished. Still further it will be noted that the spacing of the false bottom 18 relative to the bottom 11 of the pan or vessel 4 causes a distribution of heat which will be found very effective for the purposes desired. We are fully aware that cooking utensils of analogous nature have been heretofore made, used and vended, and we lay no claim whatsoever to such an article per se, that is to say, we do not desire it to be understood that we claim a non-boil-over cooking utensil, but what we do desire to be clearly understood is that by our invention and novel features of construction, we have produced a cooking utensil possessing many advantages over those heretofore in use and we wish to lay particular emphasis upon the peculiar formation of the float or valve member 30 and its disposition relative to the cover or lid 22. By its peculiar formation it will be readily seen that it will promptly close the central aperture 24 when boiling commences within the pan or vessel 4, but on the other hand it will not impede the return of any condensation or liquid boiling up through the perforations 25 from draining down and passing through the central aperture 24 and basket 26 back into the pan or vessel 4.

From the foregoing description it will be readily seen that by our invention we have made an advance in the art and the numerous advantages accruing to our improvements in cooking utensils of the character described will be self-evident without further explanation or description. While we have shown and described a preferred form or embodiment of our invention, we do not desire to be exclusively restricted thereto in that it will be apparent slight detail changes may be effected without departing from the spirit and nature of the said invention as more particularly defined by the appended claims.

Having described our invention, what we claim as new and desire to secure by Letters Patent is:

1. A lid of the class described having a flat peripheral portion, a conical portion contiguous therewith provided with an opening at its apex, tongues punched out of said lid adjacent the said opening, a valve associated with the opening in the lid, said valve comprising a basket of substantially U shaped cross-section, said basket being adapted to be supported by said tongues and having an opening in its bottom, a flat float disposed within the basket consisting of a central portion adapted to seal the opening in the lid, and radial arms extending from said central portion for holding said float in spaced relation to the aforesaid opening in the basket.

2. A lid for a cooking vessel having a handle integral therewith, said lid being adapted to be supported on a cooking vessel below the upper edge thereof, a shoulder portion on said handle shaped to span the upper edge of the vessel, and a spring tongue punched out of the said handle, said tongue being curved to resiliently engage the upper edge of the vessel.

3. The combination of a cooking vessel with a lid therefor, an outwardly expanded portion at the upper portion of the vessel forming a shoulder, a turned over bead at the upper edge of the vessel, the lid adapted to be supported by said shoulder, a handle attached to said lid, and means on said handle to lock the lid in position on the vessel, said means comprising a spring tongue and being adapted to cooperate with the aforesaid bead.

In testimony whereof we affix our signatures.

HAROLD V. MULFORD.
WALTER D. FELTY.